United States Patent

Watanabe

[11] Patent Number: 4,743,675
[45] Date of Patent: May 10, 1988

[54] THERMOTROPIC CHOLESTERIC LIQUID CRYSTALLINE POLYPEPTIDE COMPRISING ALPHA-BENZYL GLUTAMATE-ALPHA-ALKYL GLUTAMATE COPOLYMER

[75] Inventor: Junji Watanabe, Yokohama, Japan

[73] Assignee: Nippon Oil Company, Limited, Tokyo, Japan

[21] Appl. No.: 868,285

[22] Filed: May 28, 1986

[30] Foreign Application Priority Data

Jun. 10, 1985 [JP] Japan ................................. 60-124367

[51] Int. Cl.$^4$ .............................................. C08G 69/10
[52] U.S. Cl. .......................................... 528/328; 428/1
[58] Field of Search ........................................ 528/328

[56] References Cited

U.S. PATENT DOCUMENTS 3,119,794 1/1964 de Vries et al. .................... 528/328

OTHER PUBLICATIONS

Watanabe, et al., Macromolecules, 17, 1004–1009 (1984).
Watanabe, et al., Macromolecules, 18, 2141–2148 (1985).

Primary Examiner—Harold D. Anderson
Attorney, Agent, or Firm—Scully, Scott, Murphy & Presser

[57] ABSTRACT

A γ-benzyl glutamate-γ-alkyl glutamate copolymer having the general formula (I)

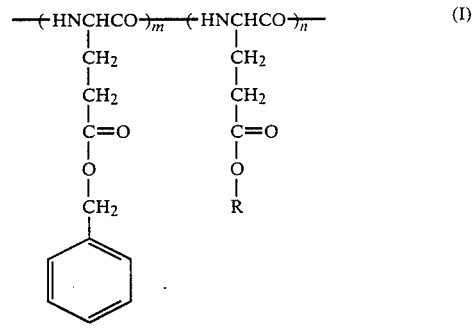

wherein;
R is $C_{10-30}$ alkyl group, m and n are $50 \leq m+n \leq 2,000$ and $m/n = 80-10/20-90$, and benzyl ester unit and alkyl ester unit are either both L-forms or both D-forms.

2 Claims, 12 Drawing Sheets

FIG. 1
SAMPLE 4-②

FIG. 2
SAMPLE 4 - ②

FIG. 9 (60 MHz)

POYMER 1

POYMER 3

POYMER 4

FIG. 10 (400 MHz)

POLYMER 7

POLYMER 9

POLYMER 11

THERMOTROPIC CHOLESTERIC LIQUID CRYSTALLINE POLYPEPTIDE COMPRISING ALPHA-BENZYL GLUTAMATE-ALPHA-ALKYL GLUTAMATE COPOLYMER

BACKGROUND OF THE INVENTION

The present invention relates to thermotropic cholesteric liquid crystalline polypeptides, and in particular the present invention relates to polypeptides which are copolymers consisting essentially of γ-benzyl glutamate and γ-alkyl glutamate and have thermotropic cholesteric liquid crystalline properties.

Generally, it has been well known that there are three phases of a substance, i.e. solid, liquid and gas as modes of existence, and further a liquid crystal which is in an intermediate state between solid (crystal) and liquid has also been known. A liquid crystal can be classified as thermotropic or lyotropic. The former is thermally induced, and the latter is formed in solution with water or other solvents. Alternatively, they can be classified as smectic, nematic, cholesteric etc. from the configurations of molecules.

Heretofore, many lower molecular compounds such as ammonium oleate, 4-cyano-4'-alkoxybiphenyl, and cholesteryl acetate have been employed as liquid crystalline compounds. Recently, the research has been concentrated on polymers having liquid crystalline properties, and aromatic polyamides and aromatic polyesters are commercially used as the fibers having higher strength. In the utilization of these liquid crystalline polymers it is important how preforms the fixation of liquid crystalline state.

Among the liquid crystalline polymers special attention has been paid to the helical structure of cholesteric liquid crystal in view of the optical functionality and the lower anisotropy of mechanical strength of molded article. In order to fix the cholesteric liquid crystalline structure, there are many processes, i.e. (1) solvent is slowly evaporated from the lyotropic state to produce a solid film, (2) thermotropic cholesteric liquid crystal is glassified in the liquid crystalline state, (3) lyotropic liquid crystal using vinyl monomer as a solvent is photopolymerized and fixed and so on.

These prior processes have the following drawbacks. The drawbacks of the process (1) are that the solvents dissolving the liquid crystalline polymer are limited and the evaporation of the solvent should be carefully effected; those of the process (2) are that the rate of crystallization of liquid crystalline polymer is fast and the glassification of the liquid crystal is difficult; and those of the process (3) are that there are few photopolymerizable vinyl monomers which can dissolve the liquid crystal as in the process (1). Further these processes have not always succeeded in controlling cholesteric pitch (or pitch simply), which is the feature of the cholesteric liquid crystal, with good reproducibility.

On the other hand, in view of moldability of a polymer, the use of thermotropic liquid crystalline polymers has been expected because of the advantage that they can be employed by a slight modification of the prior molding method of thermoplastic resins. As the thermotropic liquid crystalline polymers two kinds of polymers, i.e. in main chain type and a side chain type, have been proposed based on the chemical structure of their repeating units. The former has repeating units consisting of the rigid mesogens and flexible spacers in the main chains, while the latter has side chains containing rigid mesogens linked to flexible main chains. Apart from these, as a third type, a structure which contains rigid mesogens as main chains and flexible chains as side chains has been considered, and in fact polypeptides in which two specific alkyl groups having different chain lengths are introduced into an ester moiety of the lyotropic liquid crystalline polypeptides have been found to be thermotropic cholesteric liquid crystalline polymers (J. Watanabe et al., Macromolecules 17(5), 1004 (1984)).

These polymers have drawbacks such as a higher temperature at which they show liquid crystallinity and incomplete cholesteric structure. Thus, if these drawbacks are overcome, wider application fields will be expected.

SUMMARY OF THE INVENTION

The present invention overcomes these drawbacks and in particular the invention provides novel thermotropic cholesteric liquid crystalline polypeptides of which liquid crystallization temperature is not only lower, but also of which cholesteric pitch can be controlled widely depending on kinds and compositions of the copolymers as well as the temperature.

The main characteristic of the thermotropic cholesteric liquid crystalline polypeptides of the present invention are that their cholesteric pitchs can be changed with temperature as well as with the kinds and compositions of the copolymers and the cholesteric liquid crystalline structure can be perfectly fixed.

The thermotropic cholesteric liquid crystalline polypeptides of the present invention consist essentially of γ-benzyl glutamate-γ-alkyl glutamate copolymers having the following general formula (I):

wherein: R is $C_{10-30}$ alkyl; m and n are $50 \leq m+n \leq 2000$, $m/n = 80-10/20-90$; and benzyl ester units and alkyl ester units are either both L-forms or both D-forms.

PREFERRED EMBODIMENT OF THE INVENTION

The alkyl group employed in the present invention is $C_{10-30}$ alkyl, preferably $C_{12-25}$ alkyl. When the alkyl group contains less than ten carbon atoms, the polymer shows no thermotropic cholesteric liquid crystallinity, whereas when it contains more than 30 carbon atoms, the synthesis of the polymer becomes difficult.

Examples of preferred alkyl groups include linear alkyl groups such as decyl, undecyl, dodecyl, tridecyl, tetradecyl, pentadecyl, hexadecyl, heptadecyl, octadecyl, nonadecyl, eicocyl, heneicocyl, dococyl, tricocyl, tetracocyl, pentacocyl, triaconcyl and also other alkyl groups having the same number of carbon atoms as the above and branched structures. Most preferably alkyl groups such as dodecyl, tridecyl, tetradecyl, pentadecyl, hexadecyl, octadecyl, eicocyl, dococyl, tetracocyl etc. are used.

The ratio of benzyl group/alkyl group in the copolymers of the present invention is in the range of 80–10/20–90, preferably 70–40/30–60. Outside these ranges thermotropic cholesteric liquid crystallinity does not appear definitely. For cholesteric liquid crystals, so called cholesteric colors are noted. Where the wavelength corresponding to this color is λm (selective reflection wavelength), cholesteric pitch is P, refractive index is n and angle of incidence to cholesteric plane is θ, the following formula is given.

$$\lambda m = nP \sin \theta$$

For the copolymers of the present invention, λm can be very widely varied by changing the ratio of benzyl group/alkyl group within the above range.

m+n or the polymerization degree is 50–2000 preferably 100–1500. When the polymerization degree is less than 50, it is difficult to obtain the liquid crystalline structure, while when it is more than the above range it is not practical because of the difficulty of moldability and the slow growth of the cholesteric structure.

In order that the copolymers of the present invention show thermotropic cholesteric liquid crystallinity, the benzyl ester units and alkyl ester units in the formula (I) should either be both L-forms or both D-forms, otherwise the copolymers do not show liquid crystallinity.

The thermotropic cholesteric liquid crystalline polypeptides of the present invention have the following characteristics;

(1) the cholesteric pitch can be varied very widely with the kinds and compositions of the copolymers as well as the temperature;

(2) the pitch significantly depends on the change of temperature, and the spectrum width at selective reflection wavelength which depends on the pitch is very narrow;

(3) the glassification (fixation) of the cholesteric liquid crystalline state can be completely effected by rapid cooling;

(4) after the fixation, the product is very stable below the transition temperature to a cholesteric liquid crystal;

(5) the temperature of phase transition to liquid crystal is 100° C.–180° C., and therefore molding is easily effected;

(6) The α-helix structure of the polypeptides is stable.

The thermotropic cholesteric liquid crystalline polypeptides of the present invention which have the above characteristics may be applicable for a light filter (a notch filter, a band pass filter etc.), color display, a device for optoelectronics with laser light, a memory element, a temperature sensor etc.

The copolymers of the present invention may be obtained by various methods. For example, they include a copolymerization of monomers corresponding to each unit, i.e. an optically active γ-benzyl N-carboxyglutamate anhydride and an optically active γ-alkyl N-carboxyglutamate anhydride, and an ester interchange of an optically active poly(γ-benzyl glutamate) with a corresponding alcohol.

Among these methods, the present invention will be illustrated by the ester interchange method which synthesis is easily carried out, as the synthesis of an L-form polymer for example.

The thermotropic cholesteric liquid crystalline polypeptides of the present invention may be obtained by carrying out an ester interchange reaction of poly(γ-benzyl-L-glutamate) (hereinafter referred to as PBLG) used as a starting polymer with the corresponding alcohol. PBLG may be easily obtained by a ring-opening polymerization of γ-benzyl N-carboxyl-L-glutamate anhydride (NCA method). The NCA method has also an advantage wherein any molecular weight of PBLG produced can be controlled.

The ester interchange reaction may be usually carried out using an acid or a base as a catalyst in a solvent. As the solvents used, those which dissolve PBLG such as dichloroethane, chloroform, dioxane etc. are preferred. Examples of the acids or the bases used as the catalyst include hydrochloric acid, sulfuric acid, toluene-sulfonic acid, acidic ion exchange resins, alkali metal alkoxides, aluminum alkoxides, sodium hydroxide, amine etc.

The rate of the ester interchange can easily be controlled depending on the reaction temperature and the reaction period. The reaction temperature may be room temperature to 150° C., preferably 40°–80° C. When the temperature is below the above range much time may be necessary for the ester interchange, while the control of the reaction is difficult when it is higher than the above range.

The glutamate copolymers obtained by the above methods show the thermotropic cholesteric liquid crystallinity and can be used for various applications.

The following examples are given to further illustrate the present invention, but it is to be understood that the present invention is not limited thereto. The various measuring methods used in the examples will be given as follows.

(1) The measurement of molecular weight.

Using a Ubbelohde's viscometer, the viscosity of the starting PBLG was measured in dichloroacetic acid as a solvent at 25° C. to obtain the molecular weight and the polymerization degree from the following formula.

$[\eta] = 2.78 \times 10^{-5}$ MW$^{0.87}$ (based on P. Doty, J. H. Bradbury, A. M. Holtzer, J. Amer. Chem. Soc., 78, 947 (1956))

The polymerization degree of the copolymer after ester interchange was assumed to be the same as that of the starting PBLG. When the reaction started from poly(γ-benzyl D-glutamate) (PBDG), [η] was measured by the same method given above, and the molecular weight and the polymerization degree were obtained in accordance with the above formula. The polymerization degree of the copolymer after ester interchange was also assumed to be the same as that of the starting PBDG.

(2) The composition (benzyl group/alkyl group ratio).

The product of ester interchange was added into methanol, and the polymer recovered was dissolved into a mixed solvent of deuterated trifluoroacetic acid and deuterated chloroform (50/50 by volume) and was determined by measuring its H-NMR spectrum.

(3) The circular dichroism (CD spectrum) and the angle of rotation.

Using an optical rotatory dispersion recorder type J-20 manufactured by Nippon Bunko Kogyo Co., the cholesteric pitch was measured within the wavelength of 700 nm to 200 nm.

EXAMPLE 1

(1) The synthesis of PBLG (NCA method).

Purified dioxane (20 ml) was added to γ-benzyl N-carboxy-L-glutamate anhydride prepared by the conventional method (1 g) and the polymerization was carried out using triethylamine as a catalyst at 30° C. After the completion of the polymerization, the reaction mixture was added to a large amount of methanol to recover the polymer. The control of the polymerization degree was effected by varying the ratio of monomer/catalyst (molar) to obtain the PBLG shown in Table 1.

(2) The synthesis of thermotropic cholesteric liquid crystalline polypeptide (ester interchange reaction).

PBLG obtained in the above (1) (1 g) was dissolved in 1,2-dichloroethane (50 ml), and after n-dodecyl alcohol (25 ml) and p-toluenesulfonic acid (a catalyst) (1.5 g) were added, the reaction was effected at 60° C. The rate of ester interchange was controlled by varying the reaction time. The results are shown in Table 2.

Figure 1:
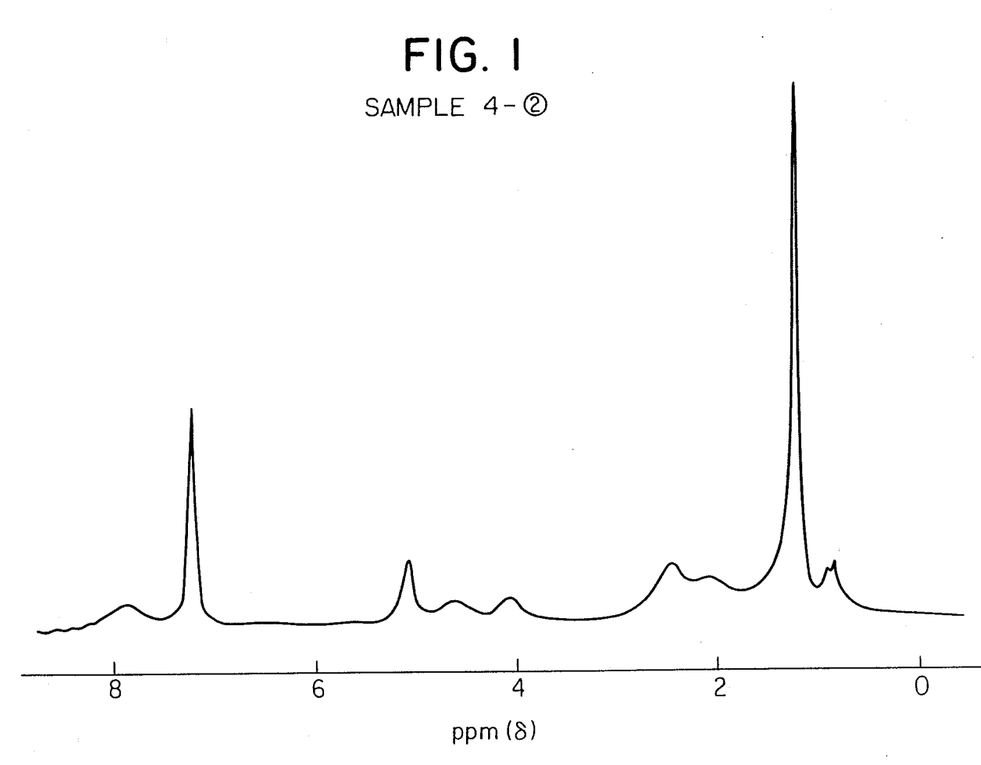
FIG. 1 is H-NMR spectrum (60 MHz) of the thermotropic cholesteric liquid crystalline polypeptides obtained in Example 1. The abscissa shows the shift values based on TMS.
Figure 2:
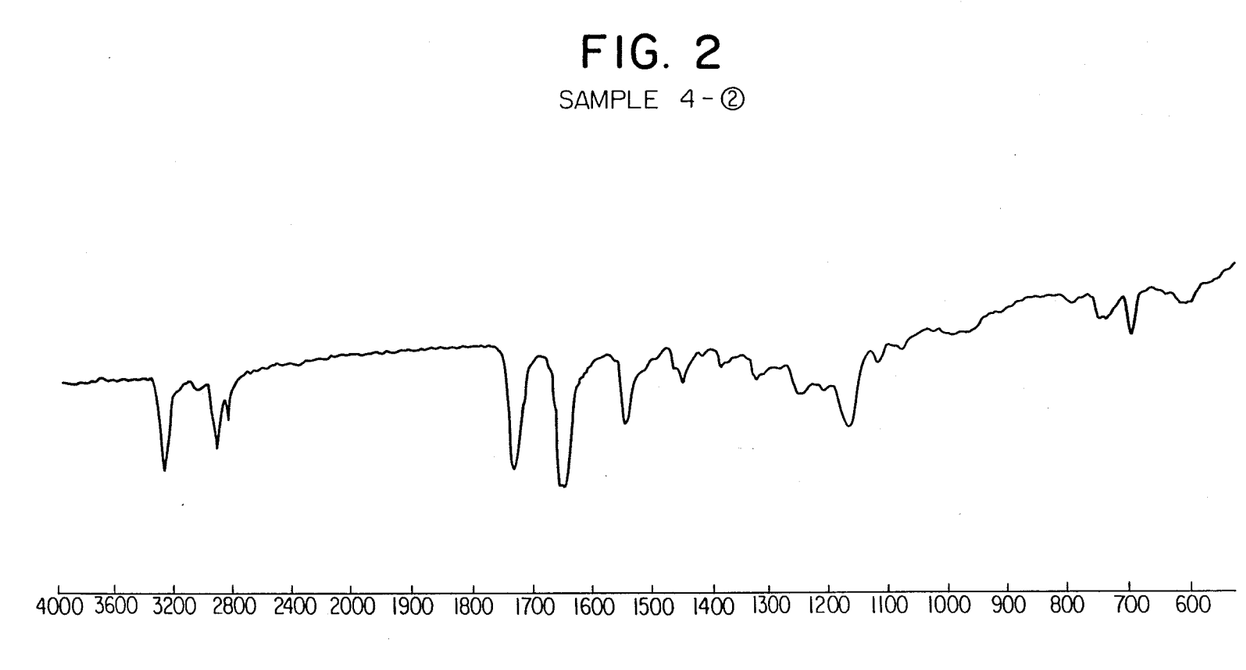
FIG. 2 is IR spectrum of the above copolymer, and the abscissa shows the wave length ($cm^{-1}$).

H-NMR spectrum and IR spectrum of the resulting copolymer are given in FIGS. 1 and 2.

TABLE 1

| No. | (dl/g) | The synthesis of PBLG Molecular weight (Mw) | Polymerization degree |
|---|---|---|---|
| BG-1 | 0.17 | $2.3 \times 10^4$ | $1.1 \times 10^2$ |
| BG-2 | 0.38 | $5.6 \times 10^4$ | $2.6 \times 10^2$ |
| BG-3 | 0.47 | $7.2 \times 10^4$ | $3.3 \times 10^2$ |
| BG-4 | 0.99 | $1.7 \times 10^5$ | $7.8 \times 10^2$ |
| BG-5 | 1.33 | $2.4 \times 10^5$ | $1.1 \times 10^3$ |

TABLE 1-continued

| No. | (dl/g) | The synthesis of PBLG Molecular weight (Mw) | Polymerization degree |
|---|---|---|---|
| BG-6 | 1.96 | $3.3 \times 10^5$ | $1.5 \times 10^3$ |

TABLE 2

| No. | Dodecyl group contents in the copolymer Dodecyl group contents (%)* | | | |
|---|---|---|---|---|
| BD-1 | 1 - ① 38.0 | 1 - ② 51.3 | — | — |
| BD-2 | 2 - ① 37.5 | 2 - ② 43.5 | 2 - ③ 49.5 | 2 - ④ 58.0 |
| BD-3 | 3 - ① 47.0 | 3 - ② 57.5 | 3 - ③ 70.0 | — |
| BD-4 | 4 - ① 32.5 | 4 - ② 42.4 | 4 - ③ 50.0 | 4 - ④ 56.3 |
| BD-5 | 5 - ① 44.8 | 5 - ② 54.7 | 5 - ③ 62.0 | — |
| BD-6 | 6 - ① 42.0 | 6 - ② 48.5 | — | — |

*% in the total ester (benzyl group plus dodecyl group)

In Table 2, the figures in the upper lines show the numbers of the samples after ester interchange.

(3) The measurement of the characteristics of thermotropic cholesteric liquid crystal.

For γ-benzyl-L-glutamate-γ-dodecyl L-glutamate copolymer obtained in the above (2), the characteristics of thermotropic cholesteric liquid crystal were measured. The numbers in each Figure such as 2-①, 2-② etc. refer to Table 2.

Figure 3:
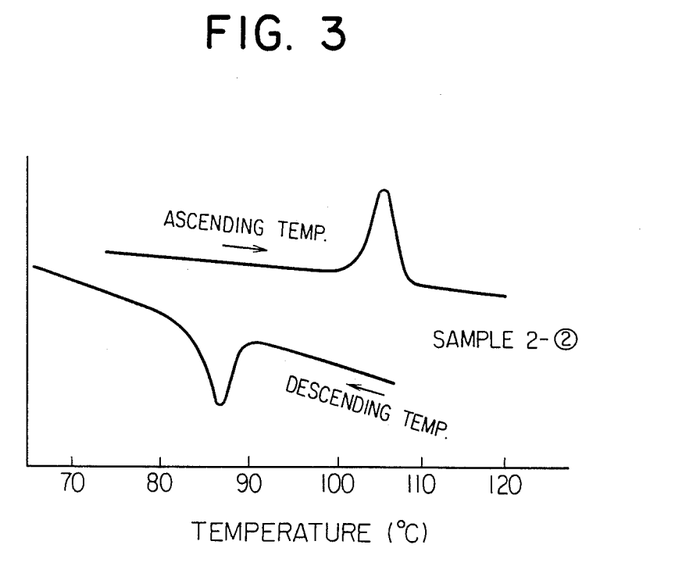
FIG. 3 is an example of DSC thermogram of the above copolymer.

① DSC (FIG. 3)

Using a film prepared from a solution in chloroform, thermal behavior was studied at 10° C./min. of a rate of ascending temperature and 10° C./min. of a rate of descending temperature.

As clearly indicated in FIG. 3, the copolymer of the present invention was found to have 100° C.–120° C. of the temperature of phase transition to liquid crystal.

Figure 4:
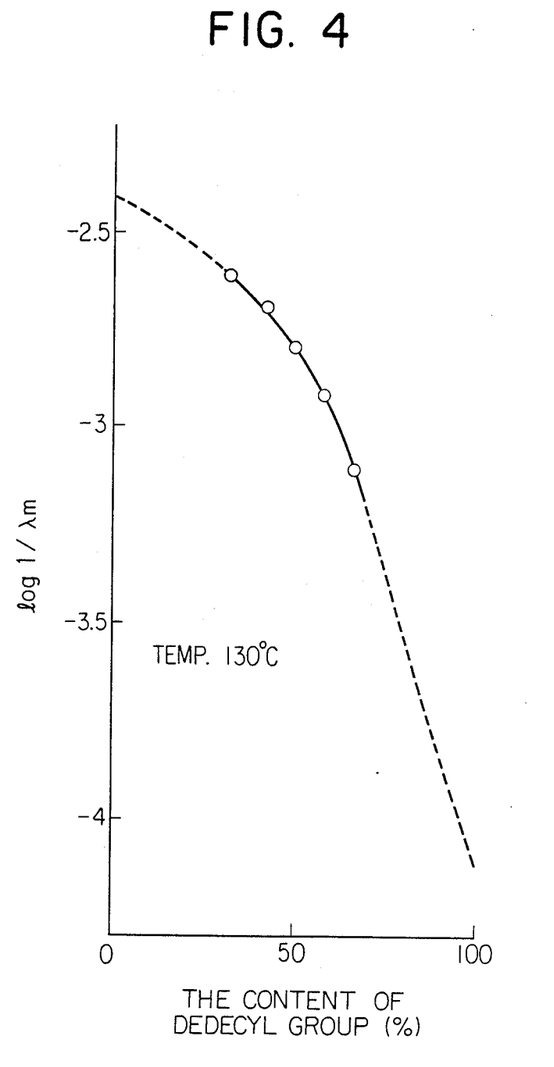
FIG. 4 shows the relation between the content of dodecyl group and the selective reflection wavelength λm at 130° C.

② Composition dependency of cholesteric pitch (FIG. 4)

The change of the selective reflection wavelength λm depending on the composition of dodecyl group (i.e. the ratio of ester interchange) in the copolymer has been determined at 130° C. By changing the dodecyl group content to 30–70%, it was found that λm was changed as widely as about 300–1600 nm.

Figure 5:
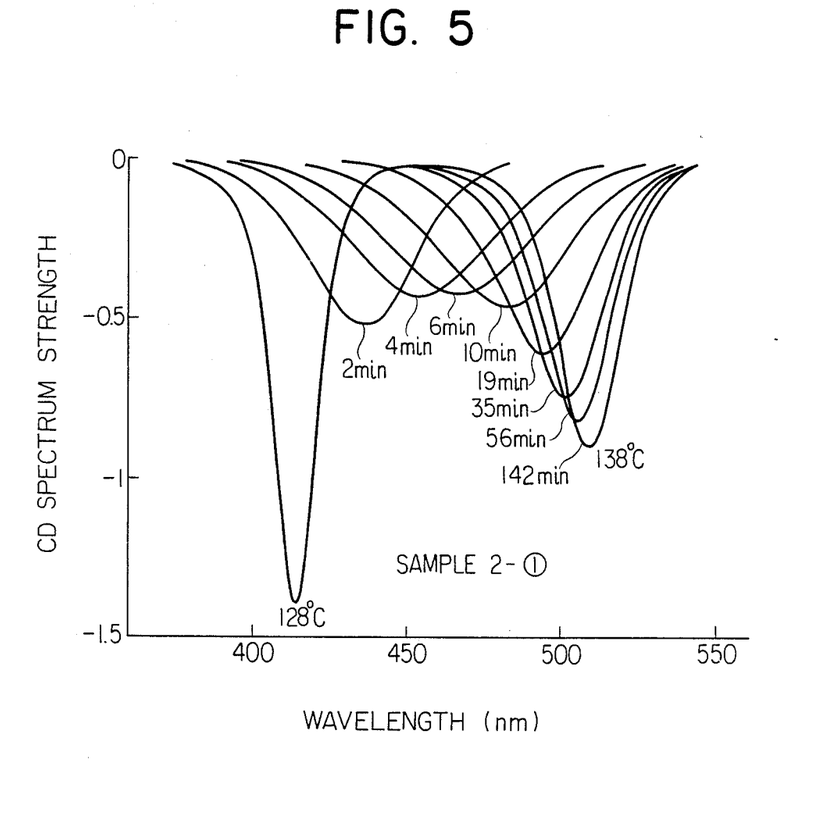
FIG. 5 shows the change of CD spectra of the liquid crystal when the temperature is jumped by 10° C., and the numerals in the Figure are the time (min.) after the jumping of the temperature.
Figure 6:
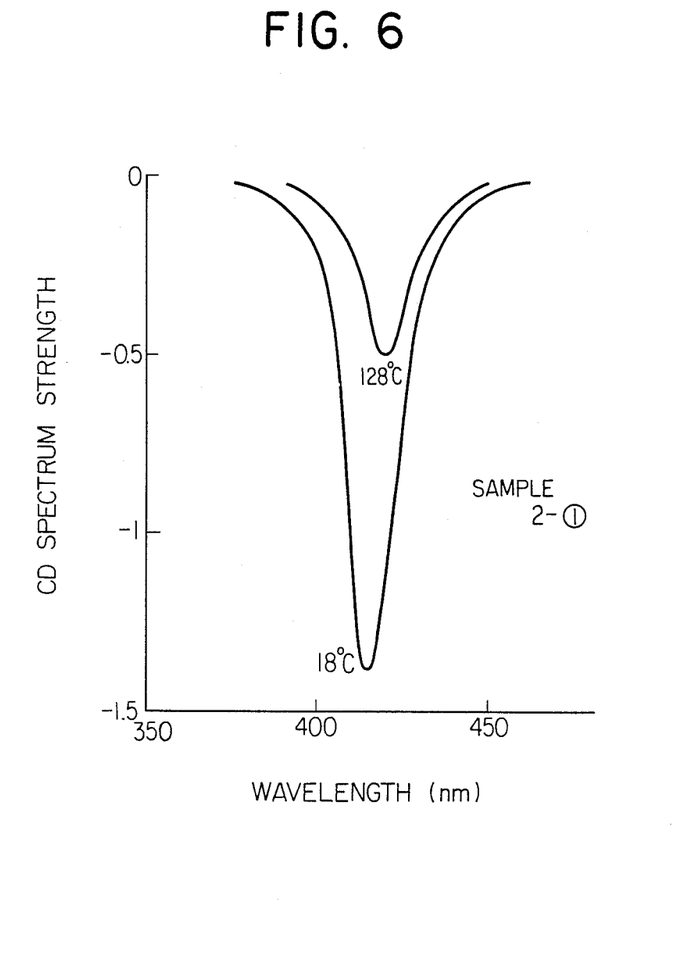
FIG. 6 shows the change of the spectra when the copolymer is rapidly cooled from 128° C. of the liquid crystalline temperature.
Figure 7:
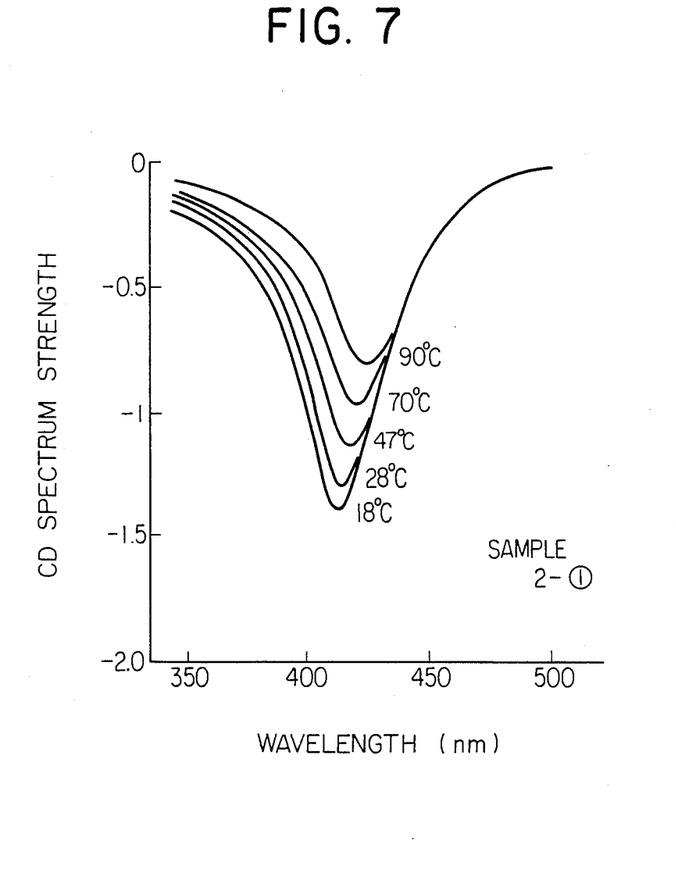
FIG. 7 shows CD spectra at each temperature below the transition temperature of the film of which liquid crystalline state has been fixed.

③ The relation of the relaxation time and the temperature change (FIGS. 5, 6 and 7).

The change of CD spectrum, when the liquid crystal having reached fully equilibrium state, was heated to a higher temperature by 10° C., was studied. As clearly indicated in the Figure, the relaxation time is relatively longer. This fact means that the complete fixation of liquid crystalline structure is possible by rapid cooling from the liquid crystalline temperature. The CD spectrum obtained by rapid cooling from 128° C. to 18° C. is shown in FIG. 6, and the CD spectrum below the transition temperature after rapid cooling to fixation is shown in FIG. 7.

Figure 8:
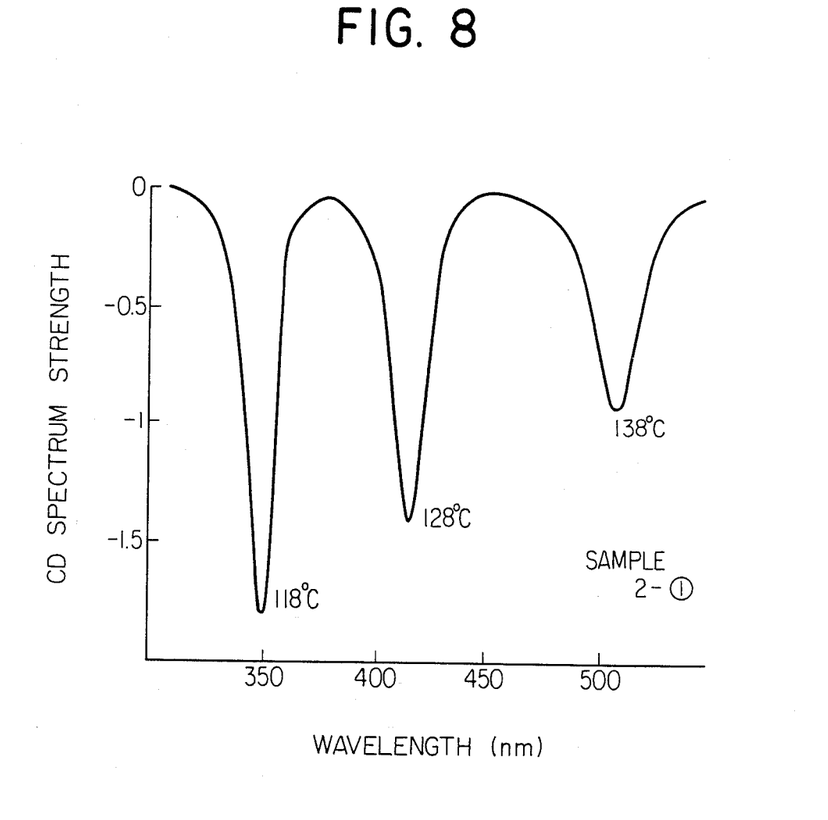
FIG. 8 shows CD spectrum at each temperature under the liquid crystalline state. The numerals in the Figure are temperature.

④ Temperature dependency of cholesteric pitch (FIG. 8).

After aging the liquid crystals enough at each temperature, CD spectra were determined. The copolymers of the present invention are so susceptible for temperature, the pitches increase along with the rise of temperature, and pass through all the visible area for about a 30° C. temperature range.

EXAMPLE 2

(1) The synthesis of PBLG or PBDG (NCA method).

Purified dioxane (20 ml) was added to γ-benzyl N-carboxy-L-glutamate anhydride or γ-benzyl N-carboxy-D-glutamate anhydride (1 g), and the polymerization was carried out using triethylamine as a catalyst at 30° C. After the completion of the polymerization, the reaction mixture was added to a large amount of methanol to recover the polymer. The control of the polymerization degree was effected by varying the ratio of monomer/catalyst (molar), and in particular when the low molecular weight polymers were necessary, dimethylformamide was used as a solvent and n-hexylamine was used as a catalyst.

(2) The synthesis of thermotropic cholesteric liquid crystalline polypeptide (ester interchange method).

PBLG or PBDG obtained by the above (1) (1 g) was dissolved in 1,2-dichloroethane (50 ml), and after adding the corresponding alcohol (15-25 g) and p-toluenesulfonic acid (a catalyst) (1.5 g) the reaction was effected at 60° C. The ratio of ester interchange was controlled by varying the reaction time. The properties of the resulting polymers are given in Table 3.

Figure 9:
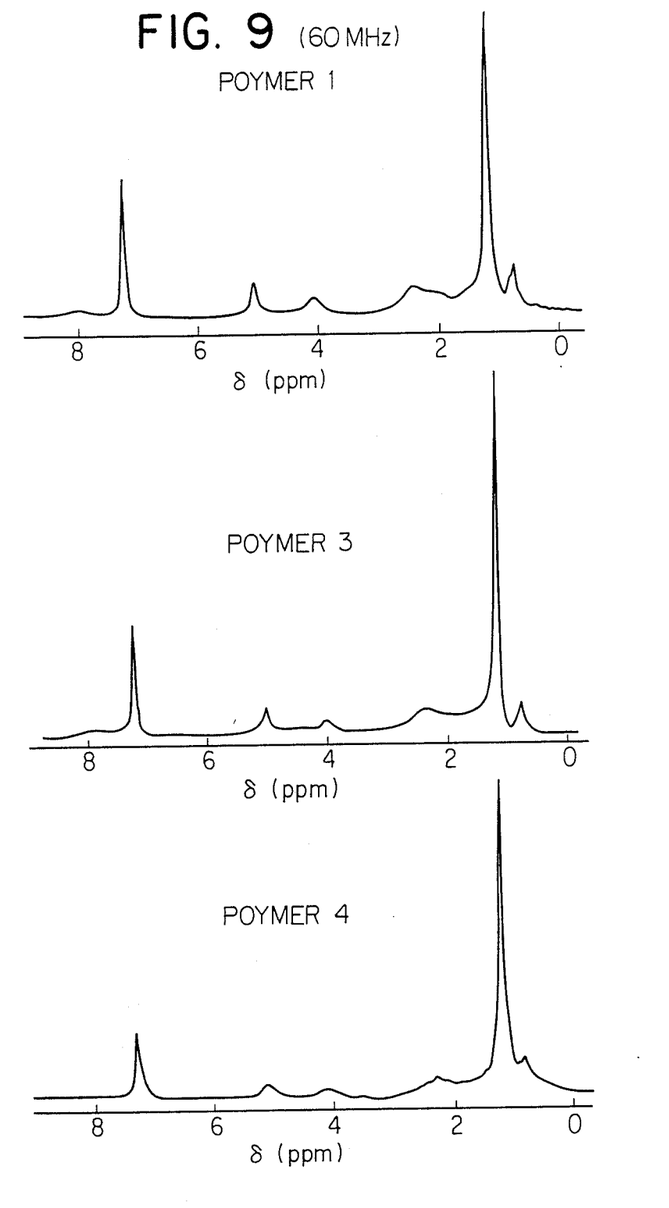
FIGS. 9 and 10 are H-NMR spectra of the copolymer obtained in Example 2 measured at 60 MHz and 400 MHz, respectively.
Figure 10:
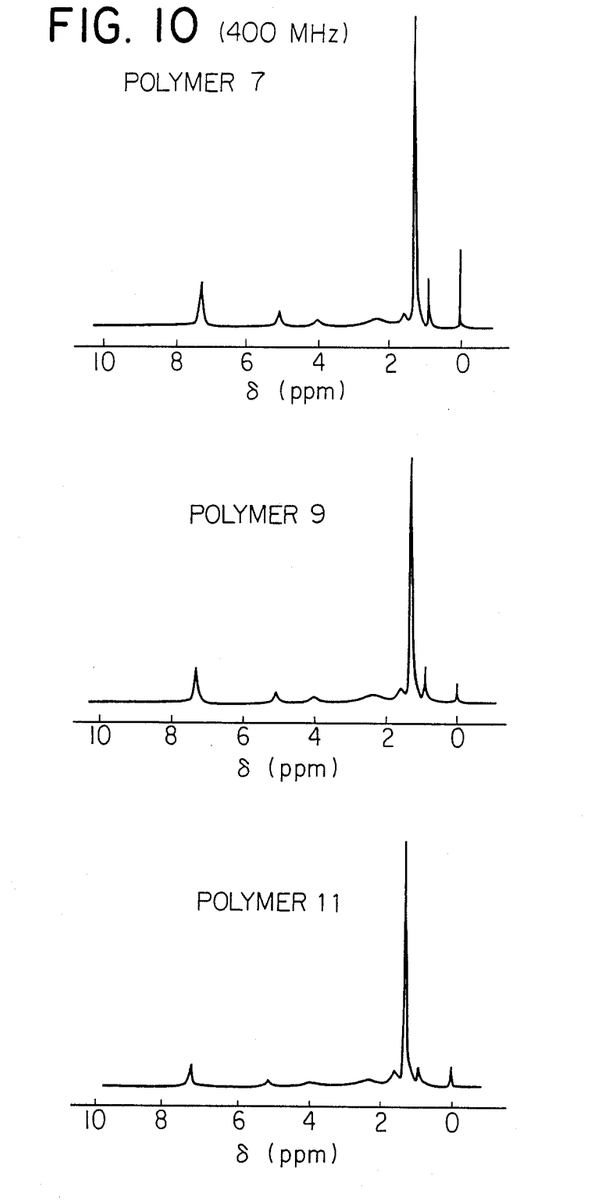

The H-NMR spectra of the copolymers are given in FIG. 9 (measured at 60 MHz) and FIG. 10 (measured at 400 MHz).

TABLE 3

The properties of the polymers

| Polymer No. | R in Formula (I) | L or D of copolymer | m/n in Formula (I) | Polymerization degree |
|---|---|---|---|---|
| 1 | decyl | D | 48/52 | 85 |
| 2 | decyl | D | 25/75 | 150 |
| 3 | tridecyl | L | 51/49 | 780 |
| 4 | tetradecyl | L | 48/52 | 780 |
| 5 | tetradecyl | L | 35/65 | 780 |
| 6 | hexadecyl | D | 60/40 | 750 |
| 7 | hexadecyl | L | 66/34 | 1000 |
| 8 | octadecyl | L | 32/68 | 1600 |
| 9 | octadecyl | L | 67/33 | 1000 |
| 10 | tetracocyl | L | 42/58 | 420 |
| 11 | tetracocyl | D | 66/34 | 240 |

(3) Measurement of the characteristics of thermotropic cholesteric liquid crystal.

The measurement of the characteristics of thermotropic cholesteric liquid crystal was carried out for the γ-benzyl-glutamate-γ-alkyl glutamate copolymers obtained by the above (2). The polymer numbers in each Figure refer to Table 3.

Figure 11:
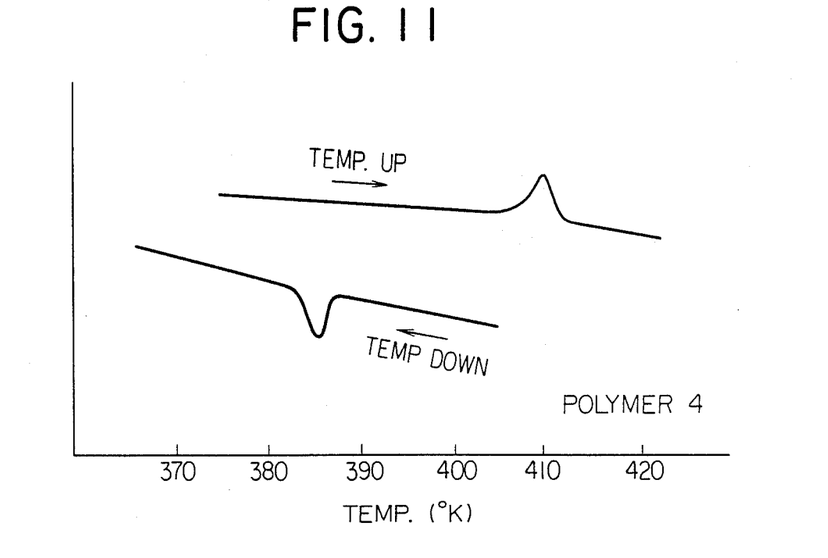
FIG. 11 shows an example of DSC thermogram of the above copolymer.

① DSC (FIG. 11).

Using a film prepared from a solution of Polymer No. 4 in chloroform, thermal behavior was studied in a rate of ascending temperature of 10° C./min. and a rate of descending temperature of 10° C./min.

As clearly indicated in FIG. 11, the copolymer of the present invention is found to have 380° K.-415° K. (107° C.-142° C.) of the temperature of phase transition to liquid crystal.

Figure 12:
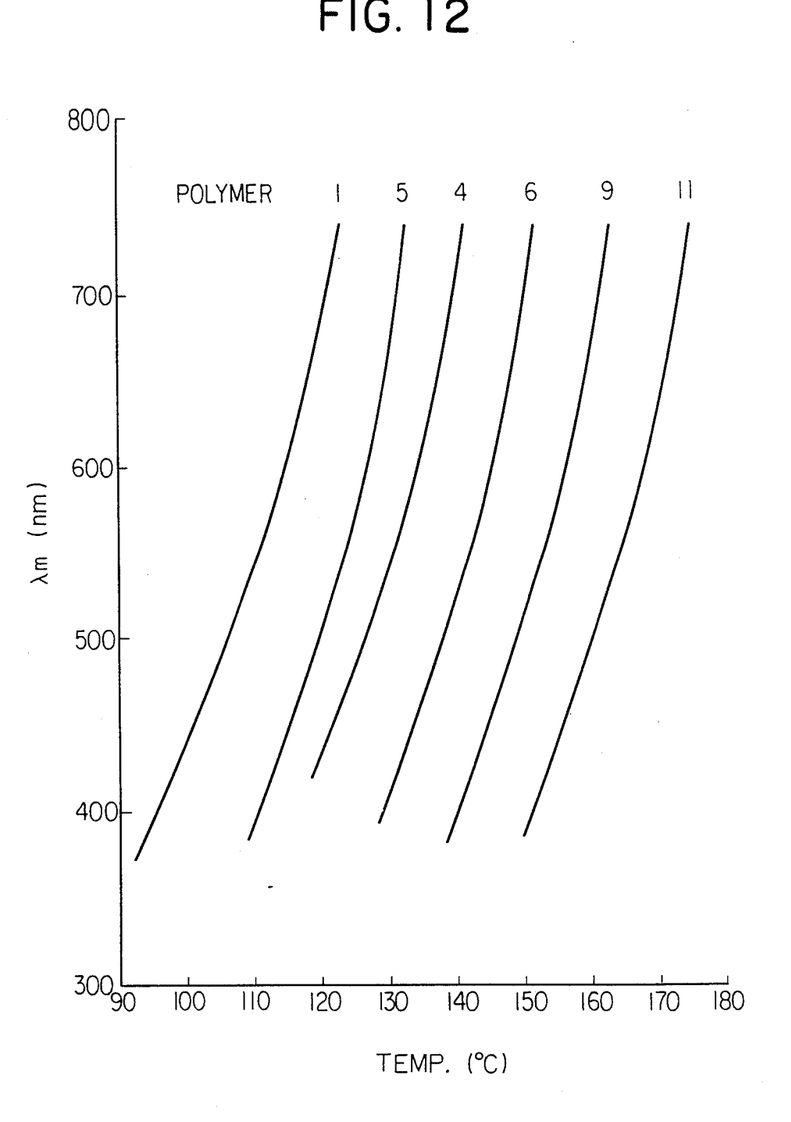
FIG. 12 is the temperature dependency of the selective reflection wavelength λm of the copolymer obtained in Example 2.

② The relation between the temperature of cholesteric liquid crystal and selective reflection wavelength (λm) (FIG. 12).

A sample from each polymer of Table 3 was placed between two plates of slide glass, and heated from melting point to a temperature producing purple color to press into a thin film, and circular dichroism (CD) spectrum was measured to equilibrium state. Then by raising the temperature by intervals of 3° C., CD spectrum at the equilibrium state of each temperature was determined. By rising the temperature little by little in accordance with the above procedure, the selective reflection wavelength corresponding to each temperature was measured. As clearly indicated in FIG. 12, λm is shifted to longer wavelength with the rise of the temperature for every polymer. Bright colors based on the selective reflection of cholesteric liquid crystal corresponding to each temperature (each wavelength) were noticed by visible observation. Thus, these polymers all exhibited definite thermotropic cholesteric liquid crystallinity.

Figure 13:
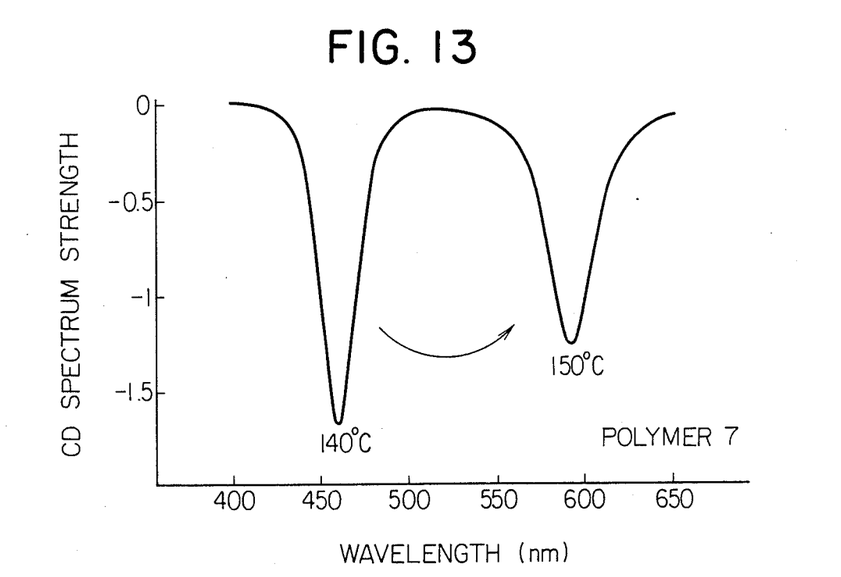
FIG. 13 is the spectrum in which the copolymer of FIG. 12 develops color and is fixed, and then the wavelength is shifted by raising the temperature, and again is fixed.

③ The fixation of cholesteric liquid crystalline structure and the change of color by temperature jumping (FIG. 13).

The polymer No. 7 was placed between two plates of slide glass, and pressed into a thin film by heating at 140° C. for 4 hours, and then cooled rapidly by putting it into water. The CD spectrum of the sample obtained was measured to be 455 nm of λm. After this the sample was then reheated at 150° C. for 4 hours and rapidly cooled by the same above procedure, the CD spectrum was determined to be 596 nm of λm. This means that the thermotropic cholesteric liquid crystal of the invention can easily fix its cholesteric liquid crystalline structure by rapid cooling, and that the wavelength (or color) can be shifted one by one by varying the temperature.

The γ-benzyl glutamate-γ-alkyl glutamate copolymers of the present invention exhibit thermotropic cholesteric liquid crystallinity and their cholesteric pitches and the corresponding selective reflection wavelengths can be widely changed depending on the kinds of alkyl group.

In addition, since the selective reflection spectrum is sharp and the cholesteric structure can be easily fixed, they may be applied for many uses such as optical elements, optoelectronics parts or decorative articles.

What is claimed is:

1. A thermotropic cholesteric liquid crystalline γ-benzyl glutamate-γ-alkyl glutamate copolymer consisting essentially of repeating units represented by the general formula (I)

wherein;

R is $C_{10-30}$ alkyl group, m and n are $50 < m+n < 2{,}000$ and m/n = 70-40/30-60, and benzyl ester unit and alkyl ester unit are either both L-forms or both D-forms.

2. A copolymer as claimed in claim 1, wherein R is $C_{12-25}$ alkyl group.

* * * * *